(12) United States Patent
Sohn et al.

(10) Patent No.: US 7,802,161 B2
(45) Date of Patent: Sep. 21, 2010

(54) METHOD OF PROVIDING MULTIMEDIA MESSAGING SERVICE USING UNIQUE MESSAGE IDENTIFIER

(75) Inventors: Sang-mok Sohn, Gyeonggi-do (KR); Hong-Seo Yun, Incheon (KR); Dong-Won Na, Gyeonggi-do (KR); Ja-Young Yoon, Seoul (KR); Hee-Won Park, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1090 days.

(21) Appl. No.: 10/566,622

(22) PCT Filed: Jul. 1, 2004

(86) PCT No.: PCT/KR2004/001618

§ 371 (c)(1),
(2), (4) Date: Jul. 27, 2006

(87) PCT Pub. No.: WO2005/013544

PCT Pub. Date: Feb. 10, 2005

(65) Prior Publication Data

US 2006/0282738 A1    Dec. 14, 2006

(30) Foreign Application Priority Data

Jul. 30, 2003   (KR) .................. 10-2003-0052582
Sep. 4, 2003    (KR) .................. 10-2003-0061718

(51) Int. Cl.
   *G08C 25/02*   (2006.01)
(52) U.S. Cl. ................................. 714/748
(58) Field of Classification Search .......... 714/748, 714/797, 6, 805; 455/466, 567, 450, 406; 709/230, 227, 207
   See application file for complete search history.

(56) References Cited

U.S. PATENT DOCUMENTS

| 5,210,746 A | * | 5/1993 | Maher et al. ............. 370/216 |
| 5,526,357 A | * | 6/1996 | Jandrell .................... 370/346 |

(Continued)

FOREIGN PATENT DOCUMENTS

JP    2002-064560    2/2002

(Continued)

OTHER PUBLICATIONS

International Search Report for PCT International Application No. PCT/KR2004/001618 mailed Oct. 18, 2004.

(Continued)

*Primary Examiner*—Fritz Alphonse
(74) *Attorney, Agent, or Firm*—Lowe Hauptman Ham & Berner LLP

(57) ABSTRACT

The present invention relates to a method of providing a multimedia messaging service, which guarantees the uniqueness of a transmitted multimedia message. In the multimedia messaging method using a mobile communication network of the present invention, a multimedia message transmitted from an originating mobile station is stored. A receiving mobile station is informed of the arrival of the multimedia message. The stored multimedia message is transmitted to the receiving mobile station if a download request is received from the receiving mobile station. In this case, the stored multimedia message includes a unique message identifier distinguished from file information of other multimedia messages stored to be retransmissible.

6 Claims, 3 Drawing Sheets

U.S. PATENT DOCUMENTS

| | | |
|---|---|---|
| 5,933,417 A | 8/1999 | Rottoo |
| 6,163,873 A * | 12/2000 | Murano .................. 714/782 |
| 6,173,431 B1 * | 1/2001 | Rittle ...................... 714/778 |
| 6,757,533 B2 * | 6/2004 | Lampela et al. ......... 455/415 |
| 6,956,832 B1 * | 10/2005 | Muhonen et al. ........ 370/310 |
| 7,333,822 B2 * | 2/2008 | Laumen et al. .......... 455/466 |
| 2002/0132608 A1 | 9/2002 | Shinohara |

FOREIGN PATENT DOCUMENTS

| | | |
|---|---|---|
| WO | 9966746 | 12/1999 |
| WO | WO 03/094457 A1 | 11/2003 |

OTHER PUBLICATIONS

Office Action dated Aug. 22, 2005, for Korean application No. 10-2003-0061718, citing the above references.

Vietnamese Office Action for Vietnamese Patent Application No. 1-2006-00302.

* cited by examiner

[Fig. 1]
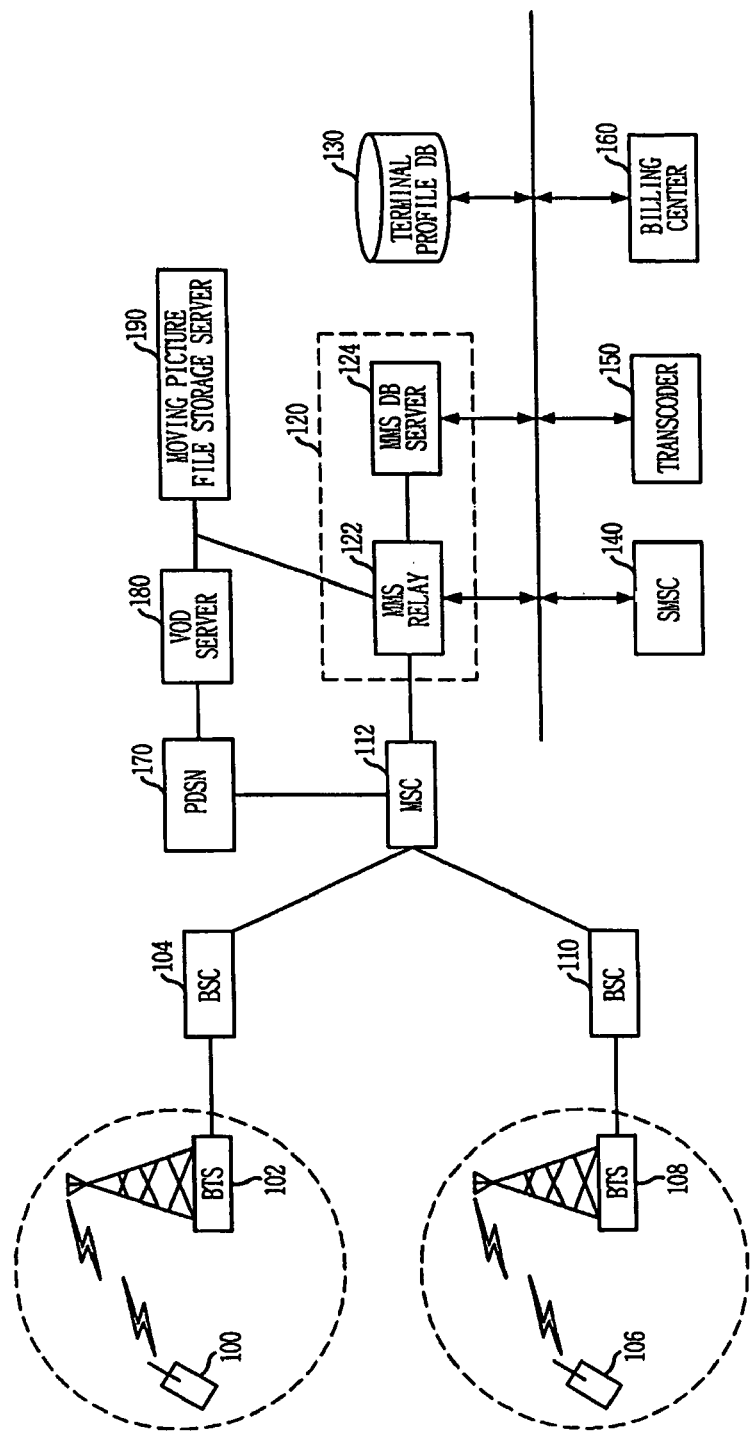

[Fig. 2]

| TYPE | YEAR | MONTH | DAY | HOUR | MINUTE | SECOND | PHONE NUMBER |
|---|---|---|---|---|---|---|---|
| 0 | 3 | 10 | 11 | 12 | 32 | 23 | 1102345678 |

[Fig. 3]

| TYPE | RETRANSMISSIBILITY | CID | SID | CP CODE |
|---|---|---|---|---|
| 1 | 0 | 34256 | 00300 | 1AB402123S |

METHOD OF PROVIDING MULTIMEDIA MESSAGING SERVICE USING UNIQUE MESSAGE IDENTIFIER

BACKGROUND OF THE INVENTION

1. Field of the Invention

The present invention relates, in general, to a method of providing a multimedia messaging service and, more particularly, to a method of providing a multimedia messaging service, which allocates a unique identifier to a multimedia message transmitted from a user and stores the multimedia message with the unique identifier, thus efficiently processing billing and providing a moving picture messaging service through an external video-on-demand server.

2. Description of the Related Art

Recently, Multimedia Messaging Service (MMS) for forwarding multimedia messages using mobile stations has been frequently used. In the early version of the MMS, multimedia messages including still pictures were serviced. However, recently, multimedia messages, in which various types of media including moving pictures are combined with each other, are serviced.

MMS is a service defined in international standards, such as the 3GPP (3rd Generation Partnership Project) Technical Specification (TS) 22.140 and 23.140

The MMS defined in the 3GPP adopts store-and-forward messaging as a message transmission method. A multimedia message is encapsulated and transmitted, along with media contents, information required to describe the media contents, and address information required to identify a message recipient. Such a multimedia message is transmitted to a Multimedia Messaging Service Center (MMSC) from an originating mobile station. The MMSC informs a receiving mobile station that the MMSC stores therein the multimedia message. Further, the multimedia message stored in the MMSC is forwarded to the receiving mobile station in response to a request from the receiving mobile station.

Multimedia contents forwarded through the Multimedia Messaging Service (MMS) are classified into free contents without copyrights and service charges and paid contents with copyrights and service charges.

However, when multimedia contents are retransmitted, since each of the multimedia contents does not have a unique identifier, a problem that unwanted contents are transmitted may occur. Especially, in the case of paid contents, the information of a Content Provider (CP) can be ascertained through content identifiers allocated to respective contents, but billing information is not included in the content identifiers, making it impossible to process billing for retransmission.

Moreover, a moving picture messaging service is not directly processed by an MMS relay, but processed by an external Video-on-Demand (VOD) server communicating with the MMS relay through an MM3 interface. However, when the external VOD server provides a moving picture messaging service in a streaming manner, there is a problem in that the uniqueness of a stored moving picture message is not guaranteed, making it difficult to process billing.

SUMMARY OF THE INVENTION

Accordingly, the present invention has been made keeping in mind the above problems occurring in the prior art, and an object of the present invention is to provide a method of providing a multimedia messaging service, which allocates a unique identifier to a multimedia message transmitted from a user and stores the multimedia message with the unique identifier, thus efficiently processing billing and providing a moving picture messaging service through an external Video-on-Demand server.

In order to accomplish the above object, the present invention provides a method of providing a multimedia messaging service using a mobile communication network, comprising the steps of storing a multimedia message transmitted from an originating mobile station; informing a receiving mobile station of arrival of the multimedia message; transmitting the stored multimedia message to the receiving mobile station if a download request is received from the receiving mobile station; and wherein the stored multimedia message includes a unique message identifier distinguished from file information of other multimedia messages stored to be retransmissible.

Preferably, the unique message identifier for the multimedia message is allocated differently to paid and free contents in such a way that a unique message identifier for free contents includes information used to identify paid and free contents, content production time information and content producer information; and a unique message identifier for paid contents includes information used to identify paid and free contents, information on whether retransmission is possible, content provider information and price information.

Further, the present invention provides a method of providing a multimedia messaging service using an external Video-on-Demand (VOD) server, comprising the steps of allocating a user's unique identifier to a requested moving picture multimedia message and storing the moving picture multimedia message with the unique identifier, if a request for transmission of the moving picture multimedia message is received from an originating mobile station; informing a receiving mobile station of arrival of the moving picture multimedia message; allowing the receiving mobile station to access the external VOD server, if a download request for the stored multimedia message is received from the receiving mobile station; the external VOD server reading the moving picture multimedia message from a database with reference to unique identifier information of the requested multimedia message; the external VOD server transmitting the read moving picture multimedia message in a streaming manner; and the external VOD server informing a Multimedia Messaging Service (MMS) relay server of termination of the transmission using a message including the unique identifier of the multimedia message, if the transmission of the moving picture multimedia message has terminated.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram of a multimedia messaging service system to which the present invention is applied;

FIGS. 2 and 3 are views showing examples of a unique identifier allocated to an MMS message.

DESCRIPTION OF THE PREFERRED EMBODIMENTS

Figure 4:
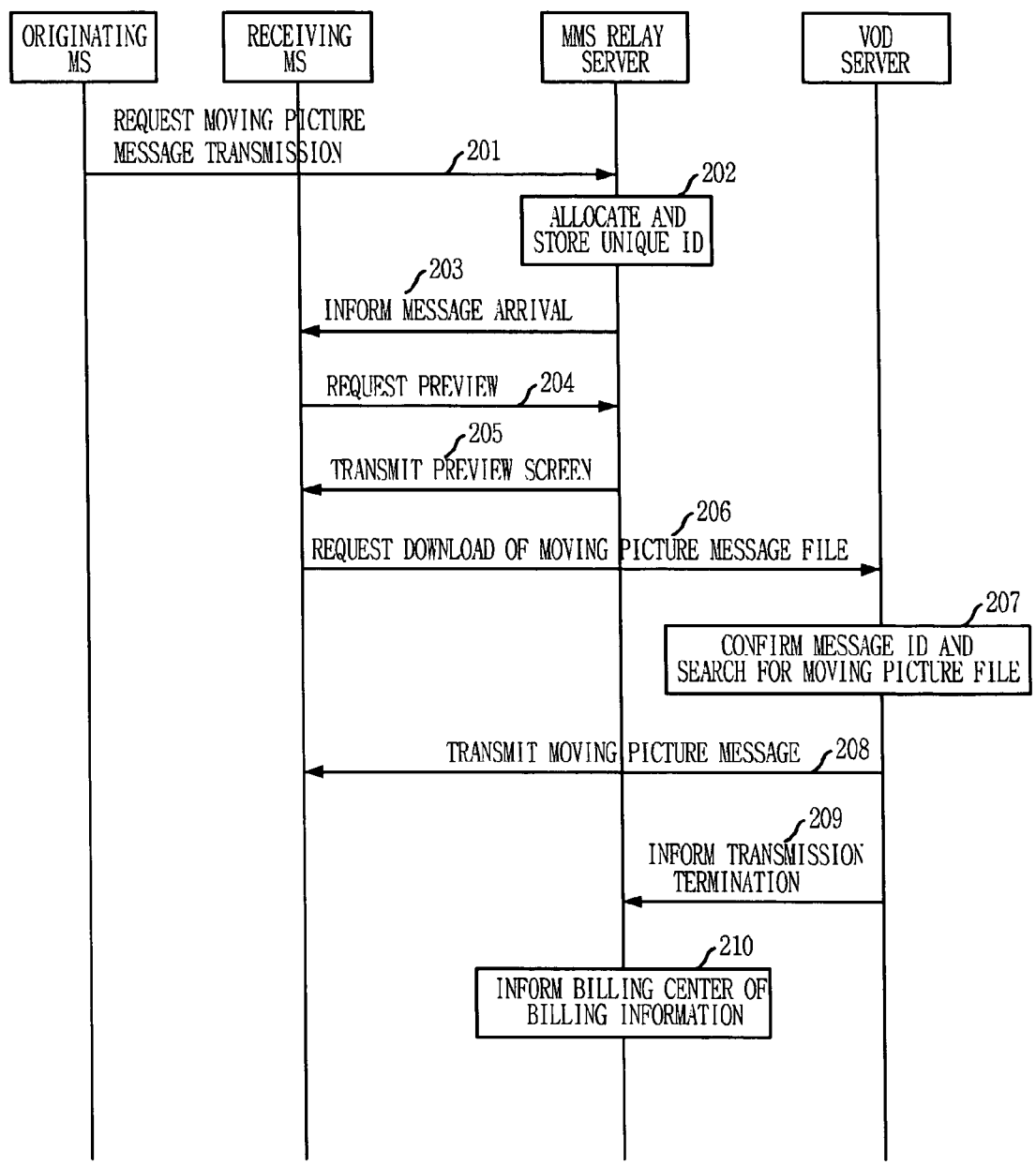
FIG. 4 is a flowchart of a method of providing a moving picture multimedia messaging service according to the present invention.

Hereinafter, embodiments of the present invention will be described in detail with reference to the attached drawings.

Reference now should be made to the drawings, in which the same reference numerals are used throughout the different drawings to designate the same or similar components.

FIG. 1 is a block diagram of a multimedia messaging service system to which the present invention is applied. The multimedia messaging service system of the present invention includes an MMS relay server 120, comprised of an MMS relay 122 and an MMS database server 124, a terminal profile database 130 and a transcoder 150.

Mobile stations 100 and 106 are devices capable of transmitting MMS messages and reproducing MMS messages. Base Transceiver Stations (BTSs) 102 and 108 establish radio links with the mobile stations 100 and 106, respectively. Base Station Controllers (BSCs) 104 and 110 manage a plurality of BTSs and perform radio channel setup, frequency hopping and handover functions. A Mobile Switching Center (MSC) 112 functions to establish a route for a requested call.

The MMS relay server 120 includes the MMS relay 122 that functions to transmit a multimedia message (MMS message) to a requested receiving mobile station, and the MMS DB server 124 that stores and manages multimedia messages. The MMS relay server 120 allocates a unique identifier to a multimedia message transmitted from an originating mobile station, stores the multimedia message with the unique identifier allocated thereto, and informs a billing server 160 of billing information if billing is required. Further, the MMS relay server 120 informs the receiving mobile station of the arrival of the multimedia message through a Short Message Service Center (SMSC) 140. The terminal profile DB 130 stores the specification information of mobile stations and is referred to by the transcoder 150 at the time of downloading multimedia messages.

The Short Message Service Center (SMSC) 140 transmits a callback Uniform Resource Locator (URL) to the receiving mobile station if a request for the transmission of a message to the receiving mobile station is received from the MMS relay server 120. The transcoder 150 converts the multimedia message to be optimized with respect to the specification of the receiving mobile station with reference to the terminal profile DB 130 when the multimedia message is downloaded to the receiving mobile station in conjunction with the MMS relay server 120.

In the meantime, the MMS relay server 120 stores moving picture data in the moving picture file storage server 190 if the moving picture data is included in a transmitted multimedia message. At this time, the MMS relay server 120 allocates a unique identifier to the moving picture message and stores the moving picture message with the unique identifier in the moving picture file storage server 190. Further, the MMS relay server 120 informs the receiving mobile station of the arrival of the moving picture message. The MMS relay 122 communicates with an external VOD server 180 through an MM3 interface. A Packet Data Serving Node (PDSN) 170 functions to provide a packet service to mobile stations. The external VOD server 180 is connected to the PDSN 170 to provide a moving picture streaming service to the receiving mobile station.

With reference to FIGS. 2 and 3, a method of allocating a unique identifier to a multimedia message according to the present invention is described.

Multimedia contents are classified into free contents and paid contents. FIG. 2 shows the configuration of a unique identifier allocated to free content, and FIG. 3 shows the configuration of a unique identifier allocated to paid content.

Each of free and paid content identifiers is composed of 22 digits. The free content identifier is composed of 1 digit indicating content type information, 11 digits indicating content production time information, and 10 digits indicating phone number information which is producer information. The paid content identifier is composed of 1 digit indicating content type information, 1 digit indicating information on whether retransmission is possible, 5 digits indicating content provider identifier (CID), 5 digits indicating price information (SID), and 10 digits indicating content provider (CP) code information.

In the examples of the content identifier shown in FIGS. 2 and 3, content type information identifies free contents and paid contents using "0" and "1", respectively. Of the content production time information, production year information is represented by 1 digit. Phone number information is represented by the remaining 10 digits, except for the first digit of "0" of the identification number of a mobile communication terminal. The information on whether retransmission is possible is identified using "0" and "1" representing possibility and impossibility, respectively.

In this case, content type information can be used to identify service providers by allocating one of the numerals 1 to 9 to the respective service providers. That is, the content type information can be set to "0" to represent free contents, "1" to represent paid contents of a first service provider and "2" to represent paid contents of a second service provider.

The free content identifier having the above configuration guarantees the uniqueness of the identifier because content production time information in the unit of a second is included in the identifier. That is, the reason for the guarantee of the uniqueness is that it is actually impossible for one user to simultaneously produce a plurality of contents in the same time slot having a width of a second. Moreover, a CP code included in the paid content identifier is allocated by the Content Provider (CP) so as to arbitrarily guarantee the uniqueness with respect to each of contents, thus guaranteeing the uniqueness of each of paid content identifiers. Further, retransmission and re-billing are supported using the information on whether retransmission is possible and price information SID, in which both are included in paid content identifiers.

The MMS relay server 120 determines whether content whose retransmission is currently requested is free or paid content on the basis of the content identifiers having the above-described configuration. If the content is paid content, the MMS relay server 120 ascertains whether the content is retransmissible content with reference to the information that indicates whether retransmission is possible and is included in the corresponding content identifier. If the content is retransmissible content, the MMS relay server 120 informs a mobile station having requested the retransmission of re-billing information according to the retransmission of the corresponding content with reference to price information SID.

If the originating mobile station, informed of the re-billing according to the retransmission of the content from the MMS relay server 120, transmits a message confirming the request for retransmission of the corresponding content, the MMS relay 122 stores the content whose retransmission has been requested by the originating mobile station in the MMS DB server 124. Thereafter, the MMS relay 122 informs the receiving mobile station of the arrival of the message through the short message service center 140.

If the receiving mobile station accesses the MMS relay server 120, the MMS relay 122 ascertains the specification of the receiving mobile station through the terminal profile DB 130. If the MMS message whose retransmission is requested can be reproduced by the receiving mobile station, the MMS relay 122 transmits the MMS message stored in the MMS DB server 124 to the receiving mobile station.

However, if the requested MMS message cannot be reproduced by the receiving mobile station, the MMS relay 122 requests the transcoder 150 to transcode the stored MMS message. Therefore, the transcoder 150 ascertains the specification of the receiving mobile station with reference to the terminal profile DB 130, and transcodes the MMS message to be suitable for the specification of the receiving mobile station.

The MMS message transcoded by the transcoder 150 is transmitted to the receiving mobile station through the MMS relay 122. If the transmission of the MMS message to the receiving mobile station has terminated, the MMS relay server 120 transmits billing information according to the retransmission to the billing center 160.

FIG. 4 is a flowchart of a method of providing a moving picture multimedia messaging service according to the present invention.

When receiving a request for the transmission of a moving picture message from an originating mobile station at step 201, the MMS relay server 120 allocates a user's unique message identifier information to the identifier of the requested moving picture message and stores the moving picture message with the user's unique message identifier information in the moving picture file storage server 190 at step 202.

Thereafter, the MMS relay server 120 informs the receiving mobile station of the arrival of the message at step 203. At this time, the MMS relay server 120 can generate a preview screen on which a characteristic picture of the MMS moving picture message is captured, and provide the preview screen to the receiving mobile station. In the moving picture message, callback URL information allowing the receiving mobile station to access the preview screen of the MMS moving picture message is included.

If the receiving mobile station requests the preview screen from the MMS relay server 120, the MMS relay server 120 transmits the corresponding preview screen to the receiving mobile station at steps 204 and 205. At this time, on the preview screen, a softkey for moving picture play is displayed together. A command to connect to the external VOD server that performs file downloading for moving picture messages is included in the moving picture play softkey. Therefore, if the moving picture play softkey is selected, a connection request is applied to the external VOD server that communicates with the MMS relay server 120 through an MM3 protocol at step 206.

The external VOD server searches the moving picture file storage server for a corresponding MMS moving picture message file on the basis of the user's unique message identifier information included in the download request message for the moving picture message at step 207. Thereafter, the external VOD server transmits the searched moving picture message to the receiving mobile station in a streaming manner at step 208.

After the streaming transmission of the moving picture message has terminated, the external VOD server informs the MMS relay server 120 that the downloading of the moving picture message has been successfully performed at step 209. At this time, the external VOD server informs the MMS relay server of the termination of the transmission using a message including the unique identifier of the transmitted moving picture message. Accordingly, the MMS relay server 120 identifies the transmitted moving picture message and transmits billing information to the billing center to process billing for the transmission at step 210

As described above, the present invention provides a method of providing a multimedia messaging service, which allocates a unique identifier to an MMS message, thus processing retransmission and billing for paid contents, providing a moving picture messaging service through an external VOD server, and processing billing according to the moving picture messaging service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of providing a multimedia messaging service using a mobile communication network, comprising the steps of:
   a) allocating a unique message identifier to a multimedia message transmitted from an originating mobile station, and storing the unique message identifier with the transmitted multimedia message;
   b) informing a receiving mobile station of arrival of the multimedia message; and
   c) transmitting the stored multimedia message to the receiving mobile station if a download request is received from the receiving mobile station;
   wherein the unique message identifier allocated and stored at step a) distinguishes paid contents from free contents.

2. The multimedia messaging service providing method according to claim 1, wherein the unique message identifier for the multimedia message for free contents includes information used to identify paid and free contents, content production time information and content producer information; and
   a unique message identifier for paid contents includes information used to identify paid and free contents, information on whether retransmission is possible, content provider information and price information.

3. The multimedia messaging service providing method according to claim 2, wherein the content production time information includes year, month, day, hour, minute and second information.

4. The multimedia messaging service providing method according to claim 2, wherein the content producer information includes at least a part of a phone number.

5. The multimedia messaging service providing method according to claim 2, wherein the content provider information includes a Content Provider Identifier (CID) and a Content Provider (CP) code.

6. The multimedia messaging service providing method according to claim 2, further comprising the steps of:
   d) determining whether a multimedia message whose retransmission is requested is retransmissible with reference to an identifier of the requested multimedia message, if retransmission of the multimedia message previously transmitted is requested;
   e) informing the originating mobile station having requested the retransmission of billing information according to retransmission of the multimedia message, if the multimedia message is retransmissible; and
   f) transmitting the requested multimedia message to the receiving mobile station, if a confirmation response is received from the originating mobile station having requested the retransmission.

* * * * *